United States Patent
Klotz et al.

(10) Patent No.: US 9,181,996 B2
(45) Date of Patent: Nov. 10, 2015

(54) DEVICE FOR REDUCING ROD STRING BACKSPIN IN PROGRESSIVE CAVITY PUMP

(71) Applicant: Titus Tools Inc., Lloydminster (CA)

(72) Inventors: Tracy Earl Klotz, Lloydminster (CA); Dwayne Darryl Commandeur, Lloydminster (CA); Frank Jesse Lay, Lloydminster (CA)

(73) Assignee: Titus Tools Inc., Lloydminster, Alberta (CA)

( * ) Notice: Subject to any disclaimer, the term of this patent is extended or adjusted under 35 U.S.C. 154(b) by 238 days.

(21) Appl. No.: 14/013,762

(22) Filed: Aug. 29, 2013

(65) Prior Publication Data

US 2014/0060808 A1 Mar. 6, 2014

(30) Foreign Application Priority Data

Aug. 29, 2012 (CA) .................................. 2788310

(51) Int. Cl.
*E21B 19/00* (2006.01)
*F16D 51/00* (2006.01)
*F16D 55/36* (2006.01)
*F16D 63/00* (2006.01)

(52) U.S. Cl.
CPC .............. *F16D 51/00* (2013.01); *E21B 19/00* (2013.01); *F16D 55/36* (2013.01); *F16D 63/00* (2013.01)

(58) Field of Classification Search
CPC .................................. E21B 19/00; E21B 19/24
See application file for complete search history.

(56) References Cited

U.S. PATENT DOCUMENTS

| | | | |
|---|---|---|---|
| 4,415,026 A * | 11/1983 | Rezewski et al. ............ | 166/97.1 |
| 4,714,110 A | 12/1987 | Dysarz | |
| 4,844,406 A | 7/1989 | Wilson | |
| 4,860,826 A | 8/1989 | Land | |
| 5,743,332 A | 4/1998 | Lam et al. | |
| 5,765,813 A | 6/1998 | Lam et al. | |
| 5,875,841 A | 3/1999 | Wright et al. | |
| 6,079,489 A * | 6/2000 | Hult et al. .................... | 166/68.5 |
| 6,152,231 A | 11/2000 | Grenke | |
| 6,557,643 B1 * | 5/2003 | Hall et al. ..................... | 166/382 |
| 6,595,278 B1 | 7/2003 | Lam et al. | |
| 6,843,313 B2 * | 1/2005 | Hult ............................. | 166/78.1 |
| 7,000,888 B2 | 2/2006 | Wright et al. | |
| 7,673,674 B2 | 3/2010 | Lam | |
| 7,806,665 B2 | 10/2010 | Mello et al. | |
| 8,132,618 B2 | 3/2012 | Blaquiere | |

* cited by examiner

*Primary Examiner* — William P Neuder
(74) *Attorney, Agent, or Firm* — The Webb Law Firm

(57) ABSTRACT

A backspin reducing device for reducing an amount or a rate of backspin of a rod string when lifting the rotor apart from the stator of an oil or gas downhole progressive cavity pump. The backspin reducing device includes a substantially cylindrical housing having one or more threaded pin receptacles holding respective threaded pins in threaded engagement around a polished rod portion of the rod string of the progressive cavity pump. Turning threaded pins in their respective threaded pin receptacles causes the interior ends of the threaded pins to move towards or away from the polished rod in the center of the housing. Attached to the interior end of each threaded pin is a friction roller.

24 Claims, 5 Drawing Sheets

DEVICE FOR REDUCING ROD STRING BACKSPIN IN PROGRESSIVE CAVITY PUMP

CROSS-REFERENCE TO RELATED APPLICATION

This application claims priority to Canadian Provisional Patent Application No. 2,788,310 filed Aug. 29, 2012, the disclosure of which is hereby incorporated in its entirety by reference.

FIELD OF THE INVENTION

The present invention relates to the field of oil and gas wellhead equipment. More particularly, the present invention relates to wellhead devices for use in association with rod strings used for example for pulling a rotor from its mating stator in a downhole progressive cavity pump.

BACKGROUND OF THE INVENTION

Progressive cavity pumps pump a fluid by a staged movement of small sealed cavities that progress from one end of the pump to the other. Progressive cavity pumps are commonly used for oil and gas well recovery or extraction projects where there may not be enough formation back pressure to drive fluids to the surface and a form of artificial lift is required. A progressive cavity pump includes the pump components downhole, an actuator above grade and a rod string to connect the actuator to the downhole pump components. Depending upon how deep the well is the rod string can be quite long and subjected to significant forces. Rod strings are typically made from steel or other durable materials.

On occasion, the rotor of a progressive cavity pump needs to be pulled or lifted from its mating stator for maintenance, repairs, or to free a rotor that gets stuck or jammed within the stator. However, when the upper end of the rod string is disengaged from the drivehead to pull the rotor, there is a tendency for the rotor and rod string to "backspin". Backspin is a condition which occurs when a well head is being shut down for work over for example or restarted after such a work over. The tendency to backspin results from the combination of two factors. First, the rod string functions like a powerful torsion spring when it is decoupled from the drivehead. The build-up of torsional energy in the very long (relative to its diameter) rod string resulting from the twisting referred to above tends to rotate the rod string backwards. Second, when the rotor is pulled from the stator, the column of fluid (i.e., fluid head) above the progressive cavity pump is no longer supported by the pump and will tend to flow back down under the force of gravity past the pulled rotor and through the stator. As the fluid flows past the rotor it tends to cause the helical-shaped rotor to function like a progressive cavity motor and rotate backwards, thus applying torque to the rod string.

The acceleration and rotational velocity of a back-spinning rod string presents a variety of potential safety hazards at the wellhead on the surface. For instance, the upper end of the rod string, which may for example be in the form of a "polished rod", can tend to bend over while back-spinning, potentially impacting nearby persons or objects. In addition, a bent polished rod may send debris flying across the worksite. Further, extreme vibrations generated by the violent back-spinning may cause weaken or damage the support structure surrounding the rod string at the wellhead. Moreover, in some cases, contact between metal parts with high relative rotational velocities may result in sparks that could ignite combustible gases and hydrocarbon liquids at the surface.

Backspin retarders have been developed to control backspin until the fluid head and sucker rod wind-up have been reduced to safe levels. Existing backspin retarders have met with varying degrees of success. Typical prior art of retarders use built-in pumps to discharge fluid through an orifice and cause increased braking as speed increases. Some retarders have been placed on drive motor shafts and rely on drive belts. However, drive belts have been known to break, in which case backspin protection is lost completely.

Prior art patents of general interest in the field of backspin retarders include: U.S. Pat. No. 4,714,110 (Dysarz), U.S. Pat. No. 4,844,406 (Wilson), U.S. Pat. No. 4,860,826 (Land), U.S. Pat. No. 5,743,332 (Lam), U.S. Pat. No. 5,765,813 (Lam), U.S. Pat. No. 5,875,841 (Wright), U.S. Pat. No. 6,079,489 (Hutt), U.S. Pat. No. 6,152,231 (Grenke), U.S. Pat. No. 6,557,643 (Hall), U.S. Pat. No. 6,595,278 (Lam), U.S. Pat. No. 7,673,674 (Lam), U.S. Pat. No. 7,000,888 (Wright), U.S. Pat. No. 7,806,665 (Mello), and U.S. Pat. No. 8,132,618 (Blaquiere).

However, there is a continuing need for improvement in devices for reducing backspin in rod strings used in progressive cavity pumps.

SUMMARY OF THE INVENTION

What is desired is an improved device for reducing wellhead rod string backspin in rod strings used in progressive cavity pumps such as in the oil and gas industry which overcomes at least some of the problems associated with prior art devices. Preferably such an improved device would provide reliable rod spin control of the rod string during a work over for example without delaying or otherwise requiring other work over activities to stop. Preferable the improved design can improve safety and robustness of the work over activities.

Therefore according to preferred embodiment of the invention there is provided a device for use in association with a polished rod, where the polished rod is used to actuate a progressive cavity pump, said device comprising:
  a housing defining an inner passageway for said polished rod to pass through, said polished rod defining a longitudinal axis; and
  an opposed friction roller assembly within said housing, said friction roller assembly comprising:
    at least one pin receptacle extending transverse through said housing towards said inner passageway;
    a moveable pin mounted within said pin receptacle, said moveable pin being movable between an inner position and an outer position;
    a first friction roller attached to an inner end of said pin, adjacent to said polished rod, said first friction roller being configured to rotate about a second axis substantially perpendicular to said longitudinal rod axis; and
    a second friction roller opposed to said first friction roller and rotating about an axis substantially parallel to the second axis, wherein said polished rod is located between said rollers;
    at least one of said first and second frictional rollers being sized and shaped to grip said polished rod when said moveable pin is extended inwardly to a polished rod engaging position to reduce rotational movement of said polished rod about said longitudinal rod axis, while permitting longitudinal movement of said polished rod up and down said longitudinal rod axis whereby backspin in said polished rod is reduced while still allowing longitudinal movement.

BRIEF DESCRIPTION OF THE DRAWINGS

Reference will now be made to the preferred embodiments of the present invention with reference, by way of example only, to the following drawings in which.

DETAILED DESCRIPTION OF THE PREFERRED EMBODIMENTS

The present invention is described in more detail with reference to exemplary embodiments thereof as shown in the appended drawing. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein.

Figure 1:
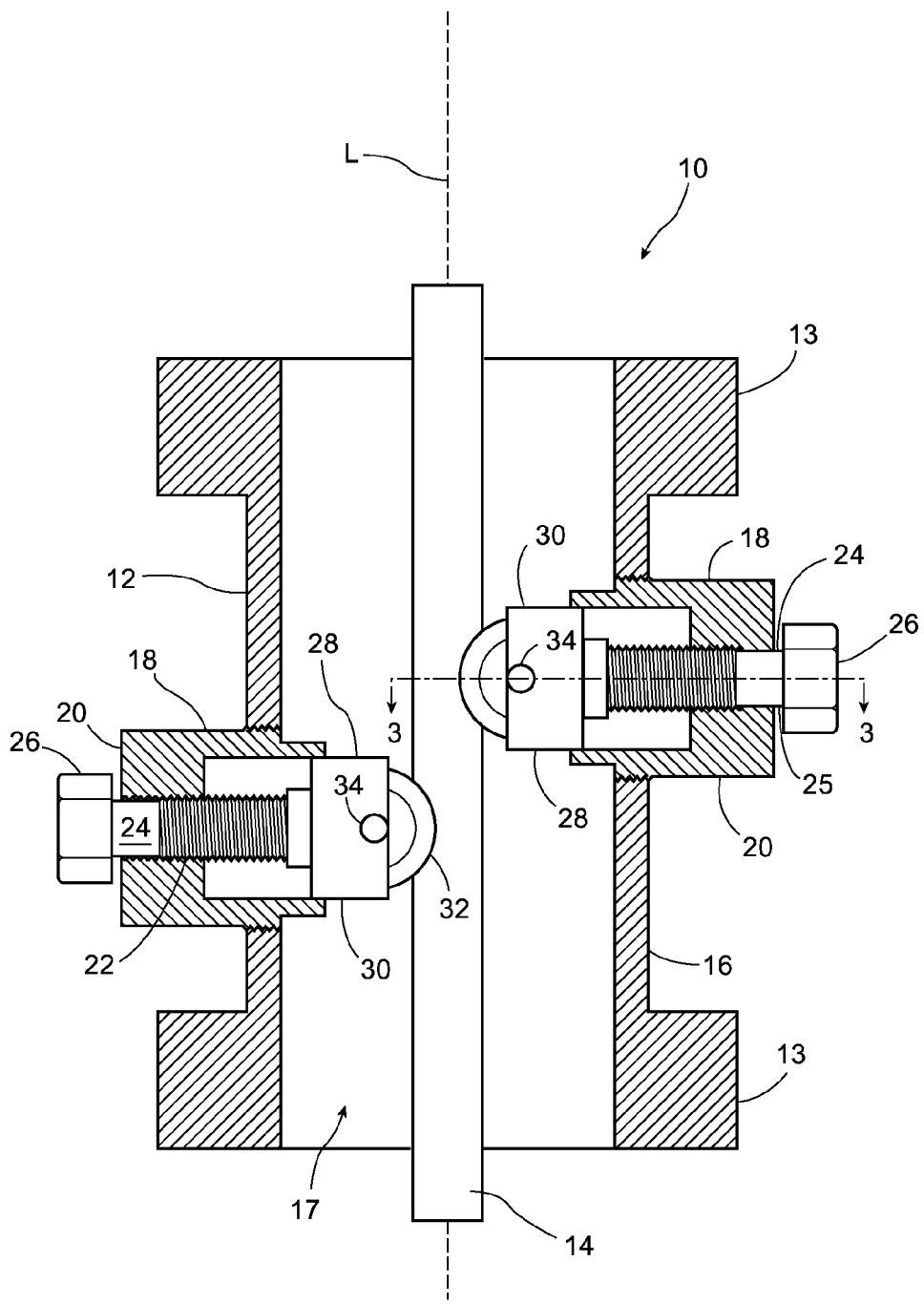
FIG. 1 is a side cross-sectional view of a backspin reducing device according to an embodiment of the present invention.
Figure 2:
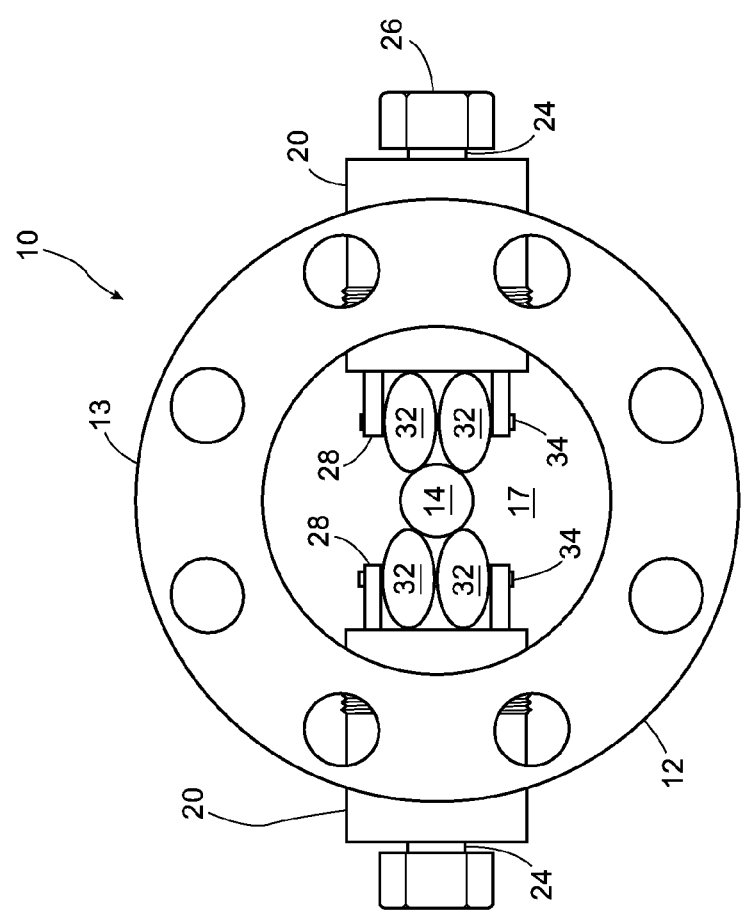
FIG. 2 is a top cross-sectional view of the backspin reducing device of FIG. 1.
Figure 3:
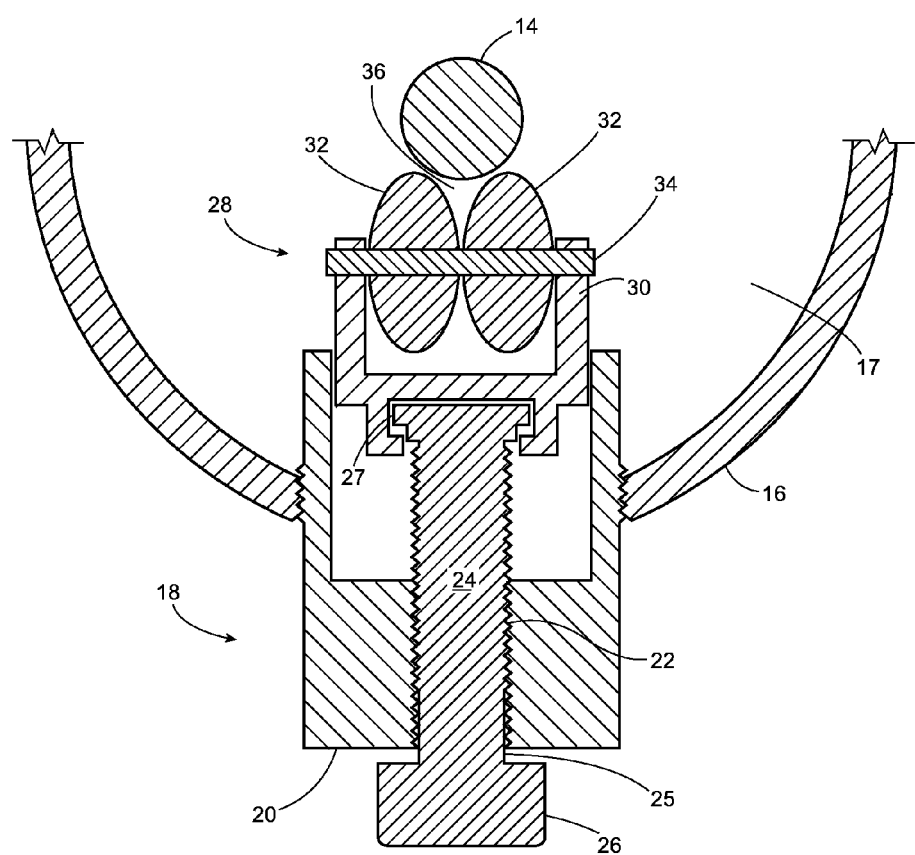
FIG. 3 is a cross-sectional view of FIG. 1 taken along line 3-3.

A backspin reducing device 10 according to a preferred embodiment of the present invention is shown in FIG. 1. Backspin reducing device 10 is capable of being used to reduce an amount of rod backspin (i.e. lessen or eliminate rod backspin), and/or reduce a rate of rod backspin (i.e. retard rod backspin) of a rod string of for example a progressive cavity pump of the type used in oil and gas wells. Such back spin may arise for example when the rotor is pulled from the stator of the progressive cavity pump. As shown, the backspin reducing device 10 includes a housing 12 which is sized and shaped to surround a polished rod 14. Preferably, housing 12 is formed from cast or machined metal and has a cylindrical wall 16 defining a central aperture 17. As can now be understood the polished rod passes through the aperture 17 and defines a longitudinal axis L.

The present invention contemplates that housing 12 to be either a separate part which is installed at a desired point on a wellhead (i.e. flange bolted using flanges 13), or part of an existing wellhead component, such as for example a flow tee, a composite wellhead, a wellhead drive unit, a side entry, or a stuffing box.

Extending into the aperture 17 is a friction roller assembly 18. The friction roller assembly 18 includes at least one pin receptacle 20 extending through said housing 12. In a preferred embodiment the pin receptacle 20 has a threaded bore 22 for a threaded pin 24. While a threaded engagement is preferred the present invention comprehends many other ways of securing the pin within the housing such as using a hydraulic ram, a spring loaded arrangement and the like. What is desired is a way that the present invention can advance the pin through the housing to engage or disengage the polished rod as desired.

According to the present invention it is further preferred that the pin receptacle 20 is removably secured in the housing 12, for example using a removable sleeve, which can be threaded to match the threaded pin, and secured to the housing 12 by means of a flange bolt attachment, a threaded sleeve attachment (as shown in FIG. 1), or the like, to permit the friction roller assembly 18 to be removed for repair or replacement. However, in other embodiments it is also contemplated that the pin receptacles 20 may be permanently fastened to the housing 12 such as by welding or the like. In other embodiments still it is contemplated that the pin receptacle 20 will be integral with the wall 16, such as for example by creating a threaded bore directly in the housing 12 and through the wall 16 sized and shaped to accept the threaded pin 24 directly. As previously described what is desired is to house the at least one pin in the housing in a way that the pin can be advanced and retracted into and out of the aperture 17.

While for foregoing description describes one such threaded pin 24, in a preferred embodiment there are at least two such threaded pins 24 on opposite sides of the housing 12 as shown. The present invention also comprehends that there can be more threaded pins 24 as explained in more detail below. What is desired is to provide enough structural support within the aperture to secure the polished rod within the frictional roller assembly 18. This requires some compressing force which can be provided by one pin which can extend out toward a second fixed pin or even two generally opposed extendible pins which can be used to squeeze against the polished rod in the middle. In certain cases for greater gripping of the polished rod there may be more that two pins used to form the roller assembly 18.

In embodiments where the backspin reducing device 10 is located in a portion of the wellhead containing oil or gas, the housing 12 is sealed to prevent the oil or gas from exiting the housing around the threaded pins. In such embodiments the internal threads of the threaded bore and the mating external threads of threaded pin 24 are preferably provided with sufficiently tight tolerances so as to form a seal. However, embodiments are also contemplated where the backspin reducing device 10 will be located in a portion of the wellhead that does not contain oil or gas, in which case the pins passageway through the housing 12 need not be sealed.

The outer end 25 of each threaded pin 24 shown in the figure is attached to a tool engaging means such as, for example, a nut head 26 to permit the threaded pin 24 to be turned in one direction to move the threaded pin 24 within the pin receptacle 20 in a direction towards the interior of the housing 12. Turning the nut head 26 in the opposite direction moves the threaded pin 24 within the pin receptacle 20 in a direction away from the interior of the housing 12. At the interior end 27 of each threaded pin 24 is attached a friction roller 28. Thus, when the nut head 26 is used, for example, to turn the threaded pin 24 in a clockwise direction into the pin receptacle 20, the friction roller member 28 moves with the threaded pin 24 towards the interior of the housing 12. Conversely, when the nut head 26 is used, for example, to turn the threaded pin 24 in a counter-clockwise direction out of the pin receptacle 20, the friction roller 28 moves with the threaded pin 24 away from the interior of the housing 12. According to one embodiment of the invention, the friction roller member 28 has a body 30 comprised of a pair of rollers 32 attached side-by-side on a common axle 34. The side by side rollers 32 preferably provide a small gap for better gripping of the polished rod 14 as described below.

Figure 4:
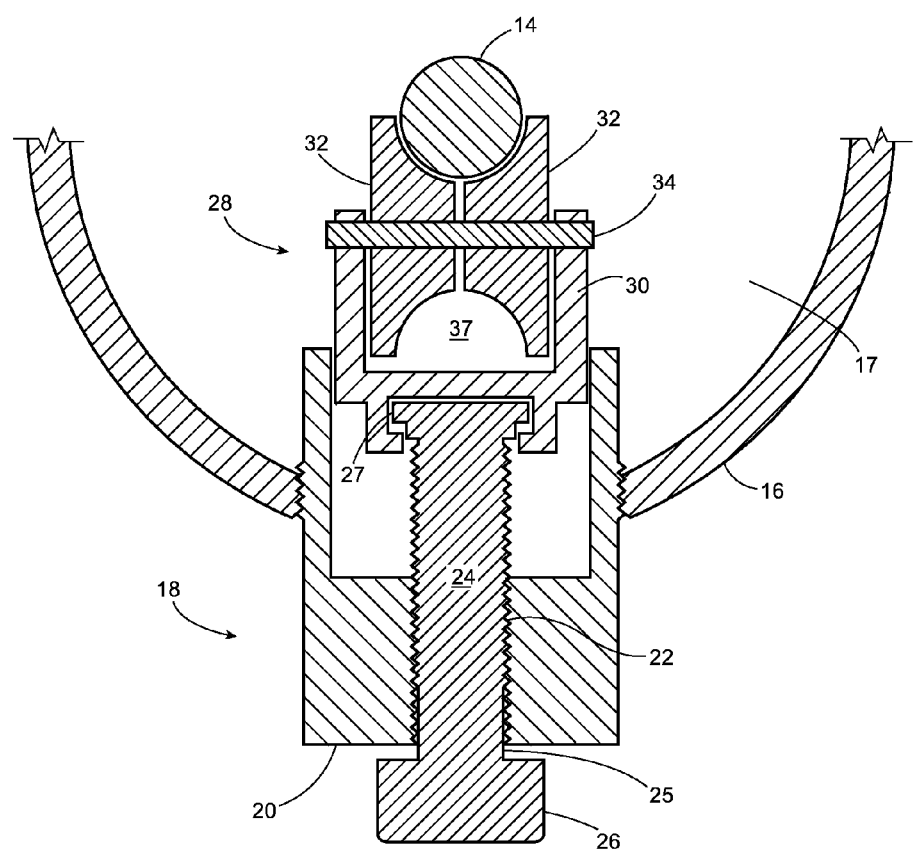
FIG. 4 is a cross-sectional view of a backspin reducing device according to another embodiment of the present invention, similar to FIG. 4, except that the pair of rollers have cross-sectional shapes to form a u-shaped space for contacting the polished rod.

The side by side rollers 32 are preferably oval-shaped in cross-section so that they form a v-shaped space 36 in the friction roller member 28, and the preferred backspin reducing device 10 is configured to permit the friction roller member 28 to contact the polished rod 14 within the v-shaped space 36. However, the rollers 32 may have other cross-sectional shapes to form other shaped spaces for contacting the polished rod 14, such as for example a u-shaped space 37, sized and shaped to fit snug about a portion of the polished rod 14, as shown in FIG. 4.

Figure 5:
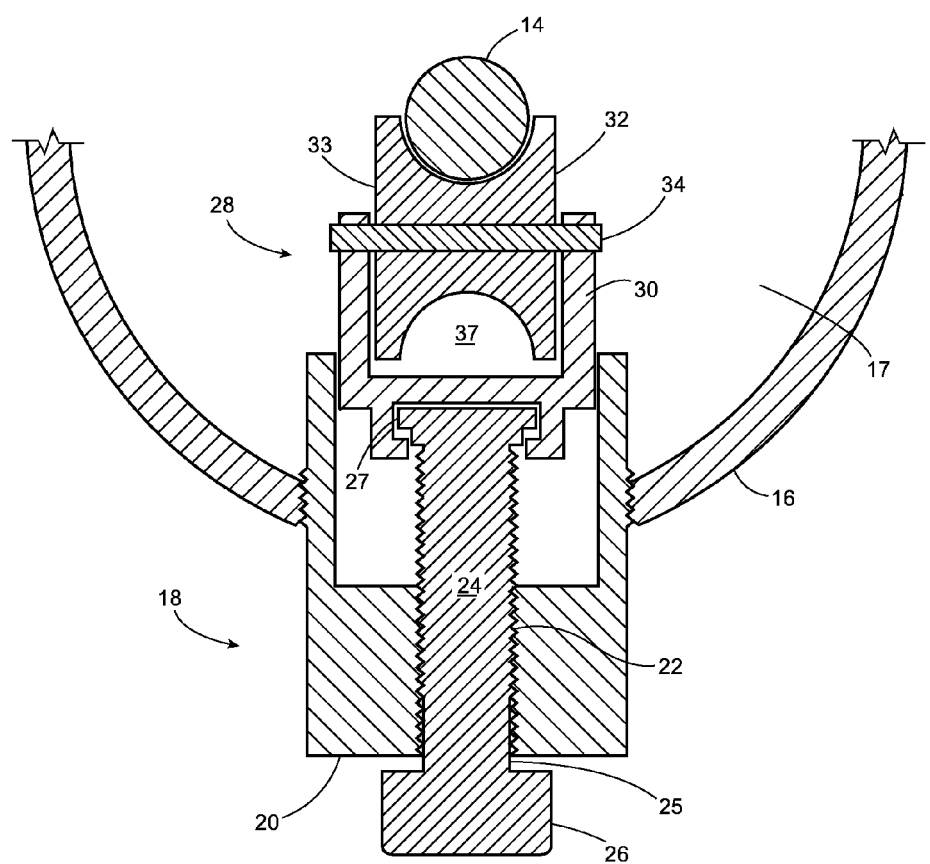
FIG. 5 is a cross-sectional view of a backspin reducing device according to another embodiment of the present invention, similar to FIG. 5, except that the pair of rollers is replaced with a single roller element.

The present invention also comprehends using a single roller element 33 rather than two side by side rollers 32, as shown in FIG. 5.

While the preferred material for the rollers 32 is steel, bronze, aluminum, rubber or a rubber-like material, other materials with similar friction inducing properties are contemplated by the present invention.

Although the preferred embodiment of the present invention includes two friction roller assemblies positioned on the housing 12 such that they are opposite to one another, more or fewer such friction roller assemblies may be positioned on the housing according to other arrangements are contemplated by the present invention. As well, the present invention comprehends that the friction rollers may be vertically off set to reduce the chance of interference between the rollers under certain conditions. Of course such vertical off setting will preferably be small enough not to compromise the gripping force that can be created between the opposed rollers.

Having now described the preferred embodiments of the present invention, the method of using the present invention will now be described.

When the backspin reducing device 10 is installed with or as part of other wellhead components, and it is desired to pull or lift the rod string from its mating stator for maintenance, repairs, or to free a rotor that gets stuck or jammed within the stator, etc., the operator will shut off the progressive capacity pump (i.e. by turning off the wellhead drive). Then the operator will simply turn the threaded pins 24 of the friction roller assemblies 18, using the nut heads 26, to force the opposed rollers 32 into gripping contact with the polished rod. Torque wrenches can be used or in the case of hydraulically actuated pins pressure sensors, to gauge the gripping pressure being applied by the roller assembly. Due to the material used in the roller's composition, in combination with the gripping pressure the frictional rollers will apply frictional torque resistance about the longitudinal or generally vertical axis of the polished rod 14 to resist rod spinning about the longitudinal axis.

As can now be understood, although the frictional roller assembly prevents the rods from spinning about the vertical axis, the rollers are mounted on generally horizontal axles which allow them to rotate in a way that permits up and down movement of the rod without allowing spinning or rotational movement. With the friction roller assemblies 18 applying frictional torque resistance to the polished rod 14, the operator can then safely pull or lift the rod string removing the rotor from the stator, since the friction roller assemblies 18 will reduce the rod backspin, while permitting the rod string to be moved vertically up and down relative to the housing 12. The degree of reduction of rod backspin may be controlled by the operator by the amount of torque applied on the nut heads 26 of the threaded pins 24, since this will determine the amount of gripping pressure exerted by the rollers on the polished rod 14.

Once the maintenance work required by the work over is complete, the operator can lower the rod string thereby inserting the rotor back into the stator. Then the operator will turn threaded pins 24 of the friction roller assemblies 18 in the opposite direction to withdraw the rollers 32 and relax the friction to the polished rod 14, and turn the progressive cavity pump back on.

In summary therefore, the present invention provides a housing which can be either an integral part of wellhead component, or a separate part that is bolted, fixed, or secured in place at a desired point around a rod string of a progressive cavity pump. By means of generally horizontally engageable and opposed rollers, a torque resistance to rotation about a vertical or spinning axis of the rod string can be applied. By reason of the axis of rotation of the horizontally engageable rollers on their axles, the rod string can be moved up and down its vertical axis without losing this rotational resistance to permitting rotation about the vertical axis.

While reference has been made to various preferred embodiments of the invention other variations, implementations, modifications, alterations and embodiments are comprehended by the broad scope of the appended claims. Some of these have been discussed in detail in this specification and others will be apparent to those skilled in the art. Those of ordinary skill in the art having access to the teachings herein will recognize these additional variations, implementations, modifications, alterations and embodiments, all of which are within the scope of the present invention, which invention is limited only by the appended claims.

The invention claimed is:

1. A device for use in association with a polished rod, where the polished rod is used to actuate a progressive cavity pump, said device comprising:
   a housing defining an inner passageway for said polished rod to pass through, said polished rod defining a longitudinal axis; and
   an opposed friction roller assembly within said housing, said friction roller assembly comprising:
   at least one pin receptacle extending transverse through said housing towards said inner passageway;
   a moveable pin mounted within said pin receptacle, said moveable pin being movable between an inner position and an outer position;
   a first friction roller attached to an inner end of said pin, adjacent to said polished rod, said first friction roller being configured to rotate about a second axis substantially perpendicular to said longitudinal rod axis; and
   a second friction roller opposed to said first friction roller with said polished rod located between said rollers;
   at least one of said first and second frictional rollers being sized and shaped to grip said polished rod when said moveable pin is extended inwardly to a polished rod engaging position to reduce rotational movement of said polished rod about said longitudinal rod axis, while permitting longitudinal movement of said polished rod up and down said longitudinal rod axis whereby backspin in said polished rod is reduced.

2. The device as claimed in claim 1, wherein said pin receptacle is formed integrally in said housing.

3. The device as claimed in claim 2, wherein said pin receptacle is a bore through said housing.

4. The device as claimed in claim 3, wherein said bore comprises internal threads.

5. The device as claimed in claim 4, wherein said pin comprises external threads for mating with internal threads in said bore.

6. The device as claimed in claim 5, further comprising a tool engaging means attached to an outer end of said pin, said tool engaging means being accessible from said outside of said housing with a matching tool for turning said pin in said pin receptacle in a clockwise or a counterclockwise direction to thereby cause said pin to move in said pin receptacle between said polished rod engaged position and said polished rod disengaged position.

7. The device as claimed in claim 6, wherein said tool engaging means is a nut head.

8. The device as claimed in claim 1, wherein said pin receptacle is removably attached to said housing.

9. The device as claimed in claim 8, wherein said removable attachment of said pin receptacle to said housing is a threaded sleeve attachment.

10. The device as claimed in claim 8, wherein said removable attachment of said pin receptacle to said housing is a flange bolt attachment.

11. The device as claimed in claim 1, wherein said pin receptacle is permanently attached to said housing.

12. The device as claimed in claim 11, wherein said permanent attachment to said housing is a welded attachment.

13. The device as claimed in claim 1, wherein said first friction roller includes two friction roller elements arranged in side-by-side relation, and configured to rotate about said second axis.

14. The device as claimed in claim 13, wherein said friction roller elements are oval-shaped in a cross-section along said second axis.

15. The device as claimed in claim 14, wherein said friction roller elements are arranged in said friction roller member to form a v-shaped space defining a v-shaped profile for gripping said polished rod.

16. The device as claimed in claim 14, wherein said friction roller elements are arranged in said friction roller member to form a u-shaped space defining a u-shaped profile for gripping said polished rod.

17. The device as claimed in claim 16, wherein said first and second friction rollers are positioned at substantially opposite sides of said passageway and are configured to engage substantially opposite sides of said polished rod.

18. The device as claimed in claim 17, wherein said first and second friction rollers are positioned on said housing to be offset from each other along said longitudinal axis of said polished rod, and configured to engage said polished rod at positions offset from one another along said longitudinal axis.

19. The device as claimed in claim 1, wherein at least one of said first and second friction rollers is made from steel, bronze, aluminum, rubber, a rubber-like material, or another material having friction inducing properties.

20. The device as claimed in claim 1, wherein said housing is attached to a flow tee, a composite wellhead, a wellhead drive unit, a side entry, or a stuffing box.

21. The device as claimed in claim 1, further comprising attachment means for attaching said housing to said flow tee, composite wellhead, a wellhead drive unit, a side entry, or a stuffing box.

22. The device as claimed in claim 21, wherein said attachment means comprises a pair of attachment flanges on said housing.

23. The device as claimed in claim 1, wherein said housing is substantially cylindrical.

24. The device as claimed in claim 1, wherein said first friction roller defines a u- or v-shaped profile for gripping said polished rod.

* * * * *